(No Model.)
J. P. BLACK.
GANG PLOW.
No. 310,022. Patented Dec. 30, 1884.
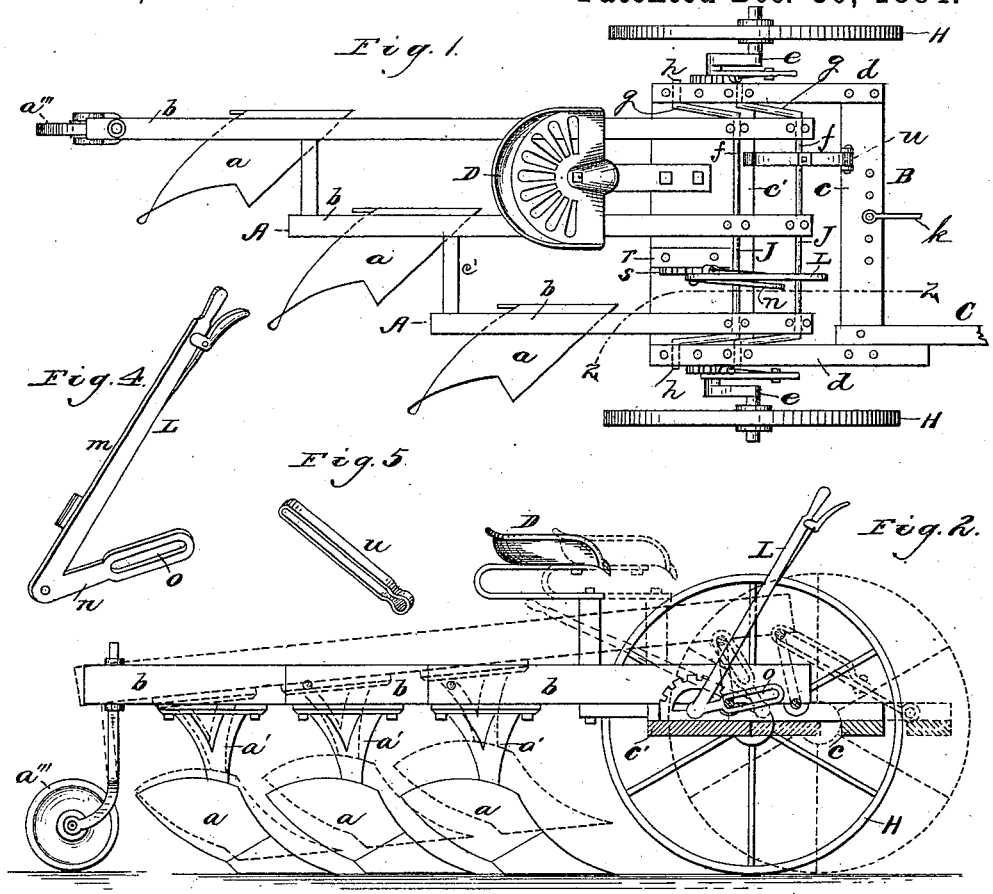
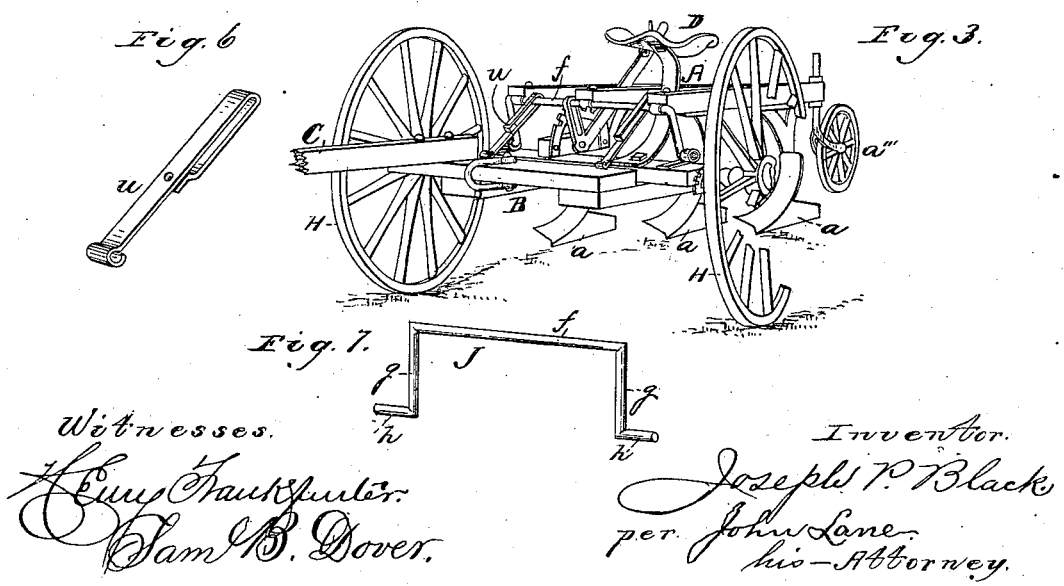
Witnesses.
Henry Frankfurter
Sam'l B. Dover.
Inventor.
Joseph P. Black,
per John Lane,
his Attorney.

UNITED STATES PATENT OFFICE.

JOSEPH P. BLACK, OF ALTON, ILLINOIS, ASSIGNOR TO HAPGOOD PLOW COMPANY, OF SAME PLACE.

GANG-PLOW.

SPECIFICATION forming part of Letters Patent No. 310,022, dated December 30, 1884.

Application filed September 11, 1884. (No model.)

*To all whom it may concern:*

Be it known that I, JOSEPH P. BLACK, a citizen of the United States, residing at Alton, in the county of Madison and State of Illinois, have invented a new and useful Improvement in Gang-Plows, of which the following is a specification.

My invention relates to gang-plows; and it consists in certain improvements which will first be described in the specification and afterward pointed out in the claims.

Heretofore gang-plows of the large and heavy kind, such as is used in the far Northwest—Dakota Territory and thereabout—have been difficult of operation, and particularly so in elevating the plows out of the ground, requiring a heavy and strong power to elevate such heavy plows. My improvements have an object to avoid such heretofore difficulties by a new and improved manner of connecting the gang to the truck, and a hand-operating lever with which the operator may elevate the plows with light power—a better and more easily operated gang-plow than has heretofore been made.

Referring to the drawings, like letters refer to like parts in all the figures, in which Figure 1 is a plan or top view of my improved gang-plow, shown as standing on level ground, with the plows down in their position for work. Fig. 2 is a side elevation of same, with parts broken away and removed to curved dotted line z in Fig. 1, to bring into view the operating-lever and its connection with the bail. Fig. 3 is a perspective view bringing into view the operating-lever and bail, with the plows elevated above the ground; also showing how the construction may be modified without departing from my invention. Fig. 4 is a perspective view, enlarged, of the operating-lever, showing how its short arm is provided with a long slot. Figs. 5 and 6 are perspective views, enlarged, of the stop-link, showing how it may be constructed. Fig. 7 is a perspective view, enlarged, of the bail, showing its construction.

In my improved gang-plow may be used two or more plows, $a$, each provided with the standard $a'$ and beam $b$, and rigidly connected together by the cross brace or beams $c$, constituting and forming the gang A, and the said gang provided with the caster-wheel $a'''$, in rear of the plows, all ordinary and well-known, as shown.

The sulky or truck B may consist of the well-known truck, with a frame made of the axle-plank $c'$ and draft-plank $c$, with the two end beams, $d$, all rigidly connected together, and the said frame is provided with the tongue C, the crank-axles $e$, is provided with the usual leveling-levers, ratchet, and segment, the seat D, and the supporting-wheels H H, as shown in the drawings. The said gang and truck are connected by the bail, or preferably two bails, pivoted on the truck, and the beams of the gang pivoted on the bail or bails; and in elevating the gang the closed end of the bail is moved from its position in advance to a position above, carrying the beams $b$ upward and elevating the plows, as fully hereinafter explained.

J represents the bail, preferably consisting of a round bar of iron, bent as shown in Fig. 7, having a closed end, $f$, with parallel sides $g$, and extending arms or journals $h$, as shown. The said closed end is loosely or pivotally connected to the beam $b$, thence the sides $g$ extend rearward and the journals $h$ journaled or loosely connected to the frame of the said truck, as shown in Fig. 1. I preferably use two of said bails—one connected to the ends of the said beams, the other connected about fourteen inches (more or less) in rear of the former, as shown in Figs. 1 and 2—both bails having a loose or pivotal connection with both the gang and truck, as shown.

The object of using two bails instead of one is that one shall brace with the other and hold the tongue and truck rigid and stiff with the gang without weight on the team when the gang is elevated, while when one bail only is used the tongue and truck can play up and down and tip over backward, and when using which the team must be so connected as to hold the tongue from tilting up and down; consequently carrying extra weight on the horses' necks. In the use of the two said bails I preferably make the front bail with about one inch (more or less) longer parallel sides, to compensate for the oblique rise of the gang, and keep the tongue in its level position, as will be understood by inspecting Fig. 2, in which the beams of the gang are shown to be on a level or a line parallel with the truck and tongue, and the dotted lines of the beams $b$ out of parallel, and the side $g$ of the front bail the longer.

L represents the operating-lever, bent somewhat L shape, with a long arm, $m$, provided with the usual thumb-latch and detent, as shown, and with a short arm, $n$, provided with a long slot, $o$, as is shown in Fig. 4. The said lever L is fulcrum-connected with the notched segment $s$ by the bracket $r$ on the truck, in rear of the closed end of the bail, and advance of the connection of said bail to the truck, and the closed end of the said bail seated at the inner end in the long slot $o$, as shown in Figs. 1 and 2. A movement of the said lever L rearward will carry the gang upward, and as the gang moves upward the said closed end of the bail slides outward in the said slot to the outer end thereof, by which the said lever operates with strong power at first, and then with diminishing power, and by which the operator can more easily elevate the gang to the desired height.

In Fig. 2 the dotted lines show the gang elevated, the truck drawn forward, and the bail turned rearward. It will be observed that the draft is applied direct to the truck through the clevis $k$ and the draft-plank $c$; that as the gang is moved upward the truck is moved forward and the bail turned rearward, and that after the starting of the gang upward by the operating-lever the draft or team will assist or complete the movement, and carry the gang to the elevation shown by the dotted lines in Fig. 2, and by the position of the gang shown in Fig. 3. To drop the gang from such elevation, the team is stopped; then the operator moves the said lever forward, carrying the gang down into working position, and the lever may be locked to the segment to hold the plows in any desired position.

$u$ represents the stop-link, which may consist of a flat bar of iron bent, forming a long slot at one end and a round slot at the other end, as will be understood by Figs. 5 and 6. The closed end of the bail is seated in the said long slot of the stop-link, and the other end of the said link is loosely connected to the truck in advance of the bail. The purpose of the said stop-link is to stop the bail, and hold and draw the gang in its elevated position, as will be understood by the drawings. In Fig. 1 the bail is shown as being at the inner end of the said long slot, and the dotted line in Fig. 2, and in Fig. 3 shows the said bail at the outer end of the said long slot. I preferably use two of said stop-links, as shown in Fig. 3. One may be used instead of two, as well, with like results, as shown in Fig. 1. The said stop-link $u$ may be dispensed with, and the short arm of the operating-lever utilized to stop, hold, and draw forward the gang in its elevated position. It will be observed that the fulcrum of said lever L is in rear of the closed end of the bail when the gang is down, changing to the bail passing over and in rear of said fulcrum when the gang is elevated, in which latter position the said short arm may be utilized, assisting, or in place of the said stop-link, to stop and hold the gang when elevated, as will be understood by inspecting the drawings.

It will be observed that when the gang is elevated the rear caster-wheel serves to carry the rear end of the gang, while the bail and truck carry the front end, and the plows are completely elevated and carried on the three wheels.

Having thus set forth my invention, I claim—

1. The combination of the gang of plows provided with beams, a truck, and the two bails, the said bails having a pivotal connection on the said truck, and the closed end of the bails forward of said connection, the said beams having pivotal connection on both of said bails, whereby the truck is held rigid from tilting when the gang is elevated, substantially as and for the purpose set forth.

2. The combination of the two bails, a gang of plows provided with beams, and a truck, the said two bails being one in rear of the other in connecting the said beams and truck, and the forward bail having longer sides than the rear bail, substantially as and for the purpose set forth.

3. The combination of the operating-lever having a short arm provided with a long slot, the truck with the bail, a gang of plows provided with beams, and a caster-wheel in rear of said plows, the said lever adapted to elevate the said plows, and the said short arm adapted to hold and draw the gang in its elevated position, substantially as and for the purpose set forth.

4. The combination of the gang and the truck with the bail, operating-lever, and the link, the latter adapted to serve as a stop to the bail in elevating the gang, also serving as a medium of draft-connection between the truck and gang when the latter is in an elevated position, substantially as and for the purpose set forth.

5. In a gang-plow, the combination of the plows $a$, provided with beams $b$, the caster-wheel $a''$, the truck B, the bail J, the operating-lever L, and the link $u$, all arranged and operating substantially as and for the purpose set forth.

JOSEPH P. BLACK.

Witnesses:
SAM MATTHEW,
CHAS. T. CLEMENT.